May 5, 1970  C. P. RICKERD  3,509,702

FRUIT AND NUT HARVESTING MACHINE

Filed Oct. 24, 1966  7 Sheets-Sheet 2

INVENTOR
CALVIN P. RICKERD by: John J. Kowalik
ATTY.

May 5, 1970 C. P. RICKERD 3,509,702
FRUIT AND NUT HARVESTING MACHINE
Filed Oct. 24, 1966 7 Sheets-Sheet 3

INVENTOR
CALVIN P. RICKERD
by: John J. Kowalik
ATTY.

May 5, 1970  C. P. RICKERD  3,509,702
FRUIT AND NUT HARVESTING MACHINE
Filed Oct. 24, 1966  7 Sheets-Sheet 7

INVENTOR
CALVIN P. RICKERD
by: John J. Kowach
ATTY.

United States Patent Office 3,509,702
Patented May 5, 1970

3,509,702
FRUIT AND NUT HARVESTING MACHINE
Calvin P. Rickerd, La Grange Park, Ill., assignor to International Harvester Company, Chicago, Ill., a corporation of Delaware
Filed Oct. 24, 1966, Ser. No. 588,845
Int. Cl. A01g 19/00
U.S. Cl. 56—328                                     19 Claims

ABSTRACT OF THE DISCLOSURE

A mobile tree shaker apparatus including an elongated boom having a tree-engaging clamp on one end and a shaker mechanism on the other end. The boom is swingably mounted on a mobile carrier for selective positioning adjacent to a tree to be gripped and shaken. Hydraulic mechanisms are provided for operating the clamp and extending and retracting the boom.

---

The present invention relates generally to apparatus used as tree shaker assemblies for fruit and nut harvesting operations.

Tree shaker assemblies with which the present invention is concerned conventionally comprise an elongatible boom which is elevatably mounted on a carrier. A limb engaging yoke is provided at the outer end of the boom to transmit limb shaking action. Hydraulic motor operated reciprocative means comprising an inertia shaker are provided to shake the limb engaging yoke. Moreover, mounting means are arranged adjacent the carrier or inner end of the boom for its elevation and also to condition the yoke over a range of limb engaging aspects.

Conventional mounting means adapt a boom to swing about a relatively fixed axis and rely for maximizing boom reach on boom extension in a plane about such axis. Thereby, boom reach is limited to a frequently inadequate extent radially from the fixed axis. Moreover, conventional mounting means are constructed and arranged so that boom reciprocating forces, in the light of the present disclosure, impose a needless strain on the carrier frame.

Furthermore, although a conventional inertia shaker may be adjustable to impress reciprocative forces of varying magnitude on a crop bearing limb, prior improvements directed to adjusting inertia shaker speed are wanting. The latter feature deserves consideration because optimum shaking conditions may be achieved by balancing shaker torque and stroke speed. Thereby, to obtain a desired harvesting result, shaker force may be minimized with a consequent reduction in the likelihood of limb damage.

While excessive shaker force may cause needless strain on tree limbs being harvested, a yet greater hazard is present because of potential inability of a conventional boom to maintain a desired length during shaking. Such likelihood in shaker assemblies having hydraulic systems for controlling boom length results because of shortcomings of fluid locking means.

It is the primary object of this invention to provide improved apparatus adapted as a tree shaker assembly.

It is an additional object of the invention to provide improved means for mounting a boom type tree shaker assembly.

It is another object of the invention that said mounting means be adapted for arrangement to permit boom adjustment for rotation about more than a fixed axis to extend boom reaching capability.

It is a further object of the invention that the mounting means be constructed to partially isolate boom shaker force from a boom carrier.

Moreover, it is an object of the invention to provide a tree shaker assembly of the class described having an improved inertia shaker for reciprocating a limb engaging yoke for crop dislodgement.

Additionally, it is an object of the invention that improved adjusting means be provided for varying the magnitude of inertia shaker force.

Still further it is an object of the invention to provide means for adjusting inertia shaker speed.

Furthermore, it is an object of the invention to provide an improved hydraulic system for longitudinal extension of the boom of the tree shaker assembly.

Yet further, it is an object of the invention to provide a novel double valved construction adapted for hydraulic fluid control in said hydraulic system for locking the extendable boom parts in fixed condition of selected extension.

A yet additional object of the invention is the provision of a novel tree shaker assembly which can be readily disassembled to allow replacement or repair of its components.

The foregoing and other objects, features and advantages of the present invention will become more apparent upon consideration of the following description and appended claims, when considered in conjunction with the accompanying drawings wherein the same reference character or numeral refers to like or corresponding parts throughout the several views.

Figures 1, 4:
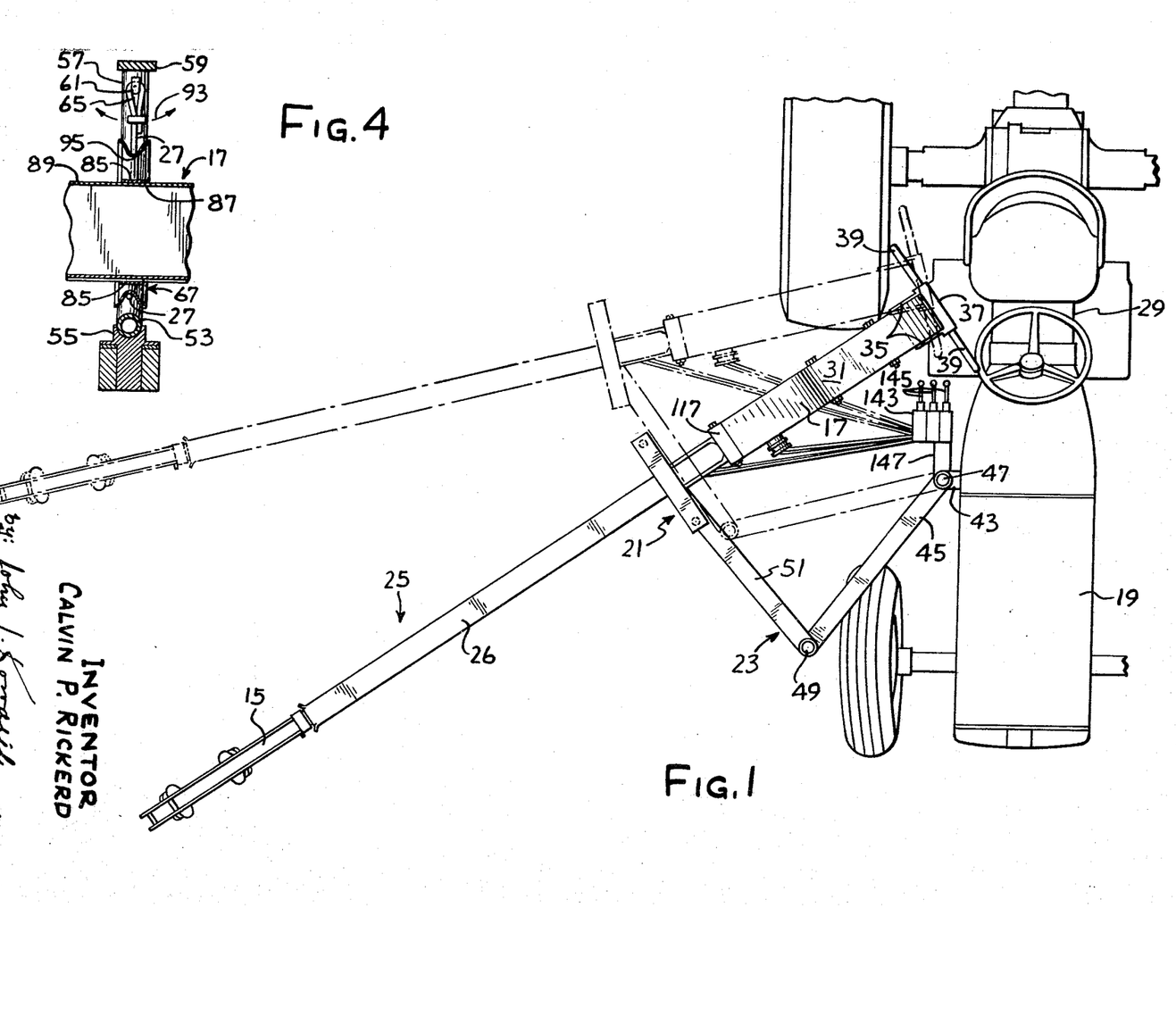
FIG. 1 is a top plan view of a tree shaker assembly embodying the present invention and shown mounted on a carrier, an alternate aspect of said assembly being shown in phantom for the purpose of illustration.
FIG. 4 is a sectional view of said mount taken substantially on the line 4—4 of FIG. 3 and looking in the direction of the arrows.
Figures 2, 3:
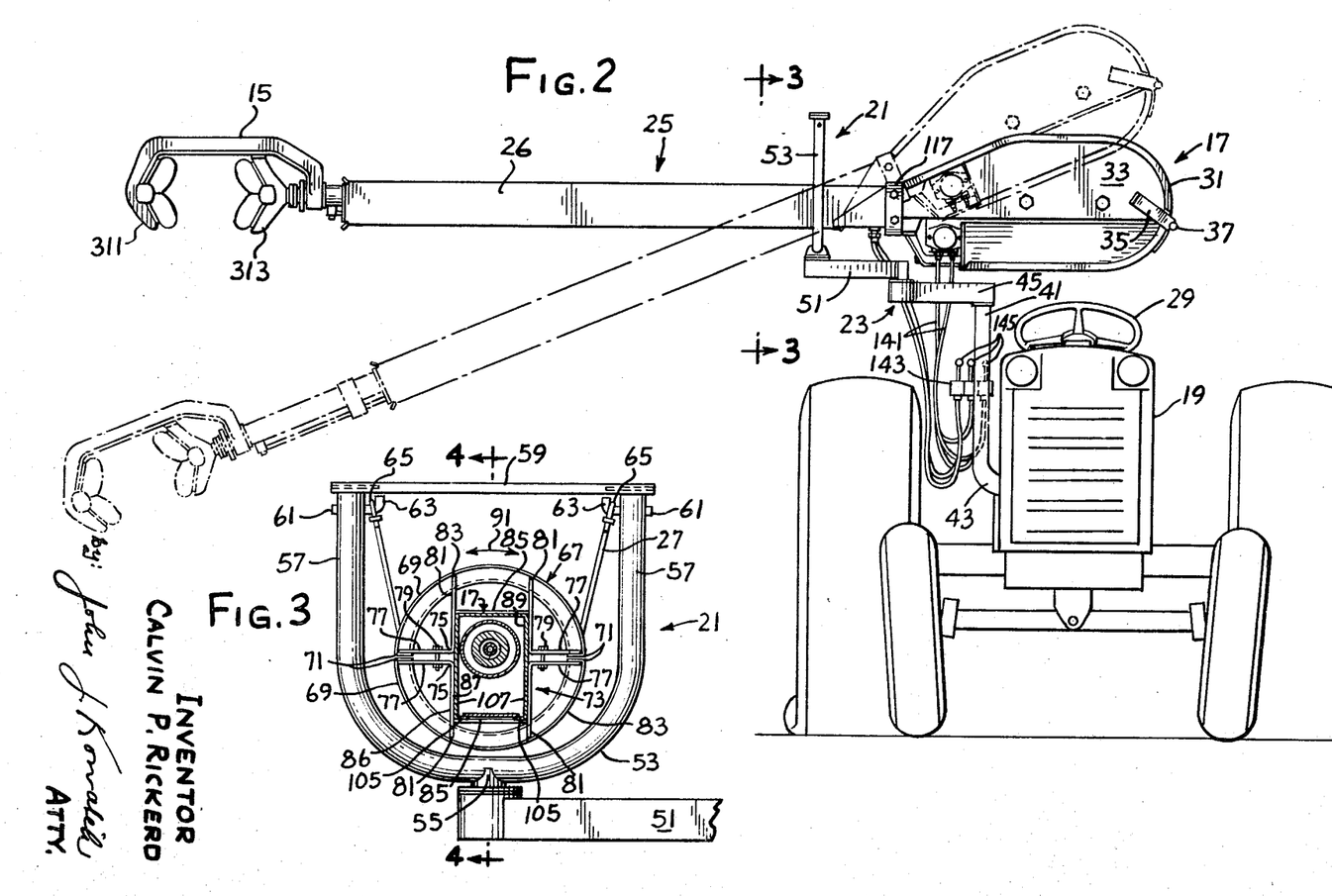
FIG. 2 is a side elevational view of said assembly as seen when viewing said carrier in front elevation, an alternate condition of said assembly being shown in phantom.
FIG. 3 is a sectional view on an enlarged scale of a tree shaker assembly mount embodying one form of the invention and taken on the line 3—3 of FIG. 2 looking in the direction of the arrows.

Referring now more particularly to FIGS. 1 and 2, there is shown a tree shaker assembly generally designated 25. Said shaker assembly may be considered as having three general parts, namely an elongated extendable boom 26, a limb engaging yoke 15 and an inertia shaker 17.

The limb engaging yoke 15 is rigidly secured from one end of the boom 26 and is adapted to grip a portion of a tree, such as a limb and the like, for the purpose of thereto transmitting reciprocative forces generated by said inertia shaker. The inertia shaker is rigidly secured from the other end of said boom. A carrier 19 for said tree shaker assembly may take the form of a self-propelled agricultural vehicle which is adapted to move said assembly from tree to tree in an orchard. The details of construction of said carrier are not limiting on the present invention and accordingly, except to the extent hereinafter defined, all further description thereof is omitted.

Figures 8, 9:
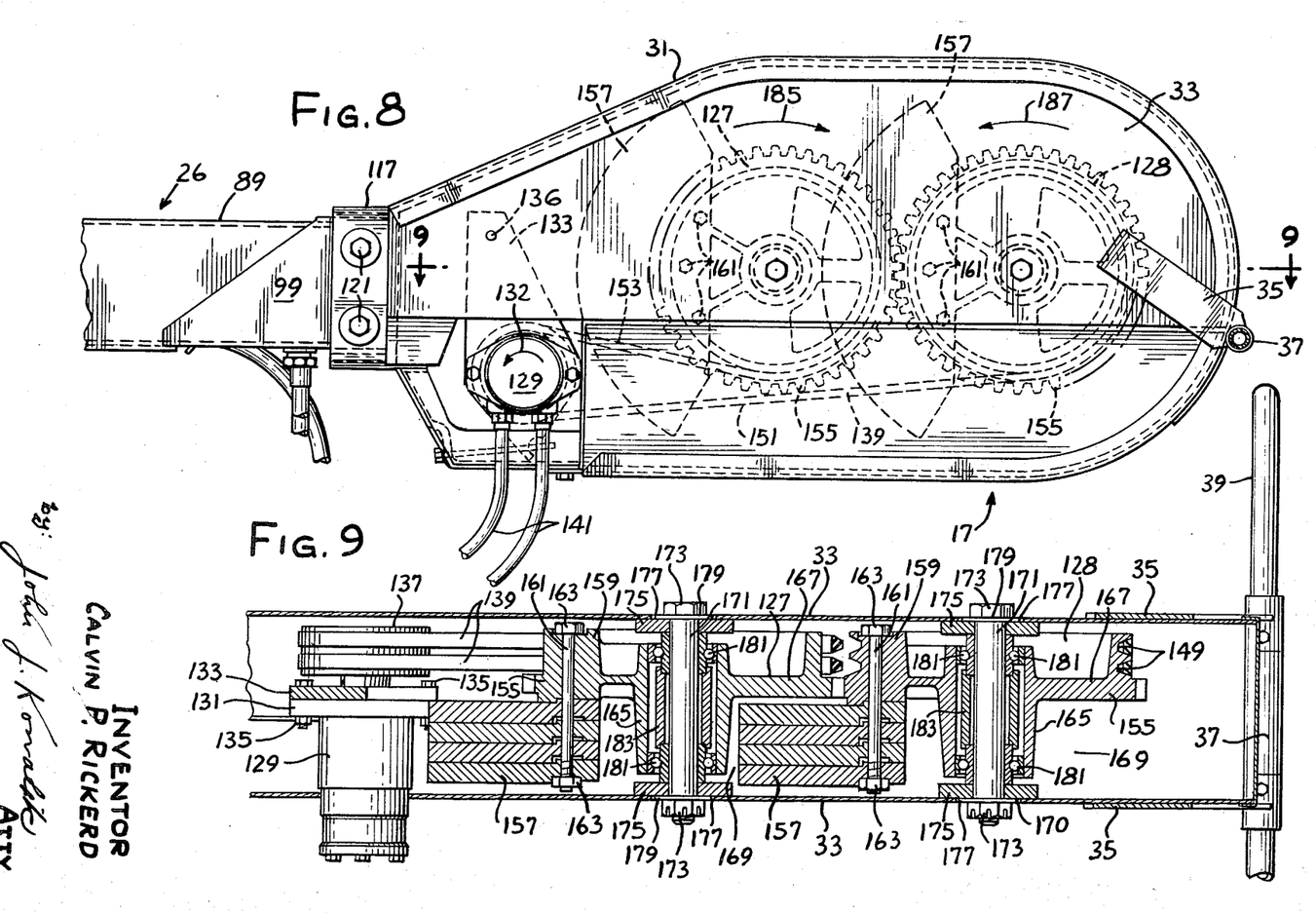
FIG. 8 is an enlarged side elevational view of an inertia shaker comprising said assembly, hidden parts being shown in dashed lines for the purpose of illustration.
FIG. 9 is a cross-sectional view of said inertia shaker taken substantially on the line 9—9 of FIG. 8 and looking in the direction of the arrows.

A mount generally designated 21 supports an intermediate portion of said boom for a range of movement by means which hereinafter will become more apparent. A stand 23 which supports said mount is arranged and proportioned to dispose said inertia shaker adjacent an operator station 29 on said carrier for aspect control of the shaker assembly. To the latter end, the inertia shaker comprises an ovate housing 31 having a pair of opposite parallel side plates 33 (FIGS. 8 and 9). A pair of opposite parallel ears 35 of a handle 37 are rigidly secured to said side plates 33 by any suitable means. Said handle comprises a pair of grips 39 which extend oppositely transversely of the longitudinal assembly axis and which are arranged at the inner or carrier end of the inertia shaker.

The stand 23 not only determines the height of the mount 21 but also provides means for swinging said mount and the therein held tree shaker assembly in a horizontal plane, as illustrated in phantom in FIG. 1. Thereby the axis about which the shaker assembly is adjustable is itself adjustable. Stand 23 comprises a vertically projecting arm 41 which has an angularly offset lower end portion 43, said lower end portion being rigidly secured to a suitable part of said carrier. An elongated horizontal link 45 is connected at one end by a pivot 47 (FIG. 1) to the upper end of arm 41. At its other end, link 45 is connected by a pivot 49 to the inner end of a horizontal link or arm 51. The mount 21 comprises a U-shaped yoke 53 (FIG. 3) which is carried on a stem 55, the latter member being connected to the outer end of arm 51. By exerting suitable torque on handle 37, the tree shaker assembly and its mount may be swung in a horizontal plane about pivots 47 and 49, or each of them, to thereby enlarge shaker assembly reach over a conventional condition in which a mount is relatively fixed.

Yoke 53 comprises a pair of vertically extending arms 57 across which there may be secured a cap or retainer in the form of a bar or plate 59. A pair of hanger lugs 61 are rigidly secured in the upper end portions of the arms 57. Said hanger lugs 61 having upwardly extending facing portions in the form of hooks 63 disposed adjacent the retainer bar 59.

A flexible cable 27, which may be a chain or the like if desired, is suspended from the hanger lugs 61. Arranged from the opposite ends of said cable is a pair of adjustable eyelet defining connectors 65. The latter are proportioned for retention by retainer bar 59 when mounted and to engage over the upwardly extending hooks 63 to mount said cable prior to securance of said retainer bar.

A wheel 67 having a peripheral groove 95 (FIG. 4) is rotatably cradled on the cable 27 which engages in said groove. In the illustrated embodiment, said wheel comprises a pair of semicircular adjoining coplanar wheel sections 69 having peripheral flanges 83. A pair of flanges or shoulders 71 are bent inwardly from opposite ends of each of said wheel sections. A clamp 73, which comprises a rectangular clamping framework 86, secures the wheel sections together.

Said clamp comprises a pair of symmetrical or like and facing clamp sections 75. Each of said clamp sections has a pair of outwardly extending arms 77 which engage, from behind and are secured to the shoulders 71 respectively of their corresponding wheel section. Thereby, as an arm 77 of each clamp section is drawn toward a facing arm 77 of an opposite clamp section, wheel sections 69 will be drawn into the wheel 67. A suitable fastener 79 secures each arm 77 to a proximal arm 77 of a facing clamp section 75.

Each clamp section 75 has a pair of extensions 81. Each of the latter is integral with and extends normally from a clamp arm 77. The extensions 81 associated with each clamp section abut and are secured to a corresponding of peripheral flanges 83 along arcurately spaced apart points and serve to rigidify wheel 67 when the wheel sections 69 thereof are arranged in assembled association.

The extensions 81 are arranged and proportioned to form two parallel sides of a framework as illustrated in FIG. 3. A straight frame member 85, at its opposite end, is connected to medial parts of extensions 81 respectively of the clamp section 75 associated with each wheel section 69. The arrangement is such that said frame members, when in assembled condition, are parallel to each other, and said frame members together with extensions 81 define said rectangular clamping framework 86 within the peripheral flanges of the wheel 67.

The wheel 67 has an enlarged boom passing opening 87 adjacent which framework 86 is disposed. A relatively fixed rectangular boom housing 89 which comprises said boom 26 is adapted for extension through opening 87. When thusly conditioned, said boom housing is gripped within said framework 86 as wheel sections 69 are drawn together by said clamp 73. By reason of the foregoing construction, said wheel and said boom may be rocked or rotated in opposite directions indicated by arrow 91 (FIG. 3) about an axis which extends longitudinally of said boom. Moreover, said wheel 67, and accordingly said boom, may be rocked to and fro in a direction indicated by arrow 93 (FIG. 4) on cable 27. The foregoing mount construction partially isolates the tree shaker assembly from the carrier in a manner which minimizes transmission of forces to the latter from the inertia shaker.

Figure 5:
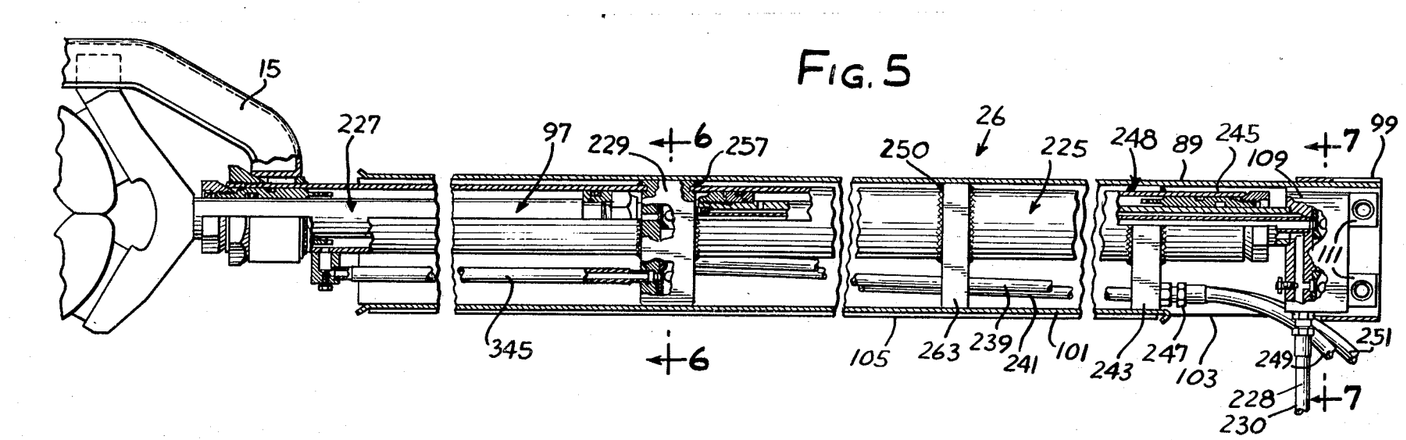
FIG. 5 is an enlarged central longitudinal sectional view of a boom comprising said assembly, parts being broken away for the purpose of illustration and to conserve drawing area.
Figure 12:
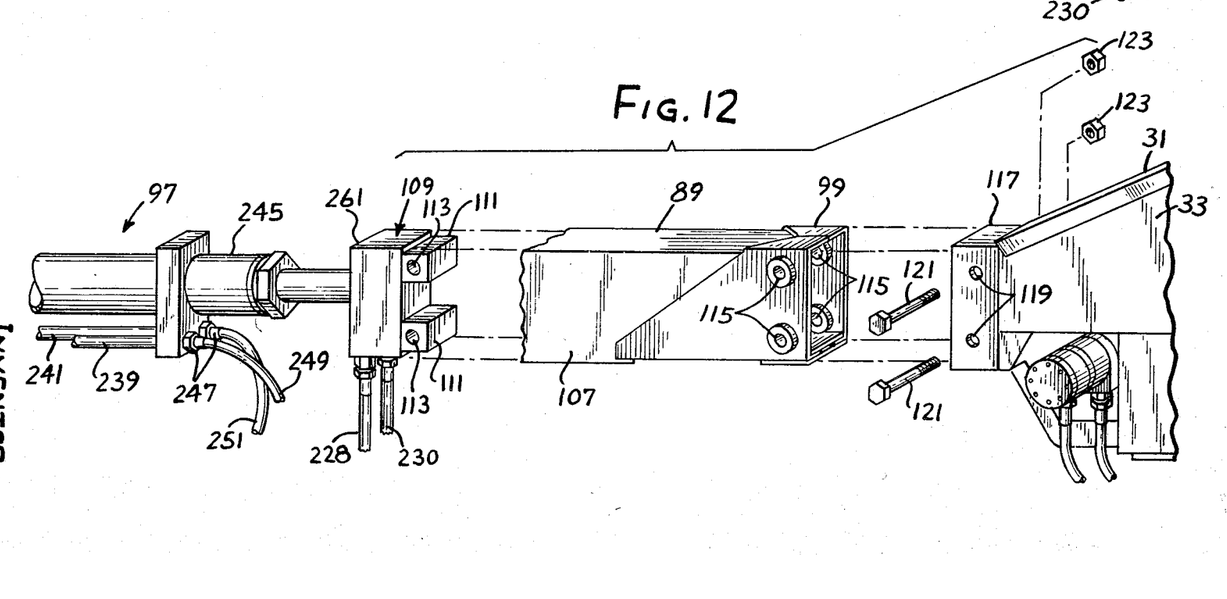
FIG. 12 is an exploded perspective view of a fragment of said tree shaker assembly for the purpose of illustrating the connection between said inertia shaker and said boom.

In FIG. 5, which shows shaker assembly 25 in substantially fully collapsed condition, it is seen that the outer or carrier distal end of boom housing 89, when thusly conditioned, is slightly spaced from the limb engaging yoke 15. A hydraulic assembly generally designated 97 for control of boom extension and yoke clamping (as will be more fully apparent hereinafter) is supported within said boom housing. A transition piece 99 (FIG. 12), which is substantially rectangular in cross-section, is secured on the inner or carrier proximate end of said boom housing 89.

The lower wall of boom housing 89 comprises an elongated plate 101 (FIG. 5) which extends from its outer or carrier distal end to a position short of said transition piece. Thereby, a rectangular opening 103 is fashioned in the underside of said boom housing. Said last mentioned opening is adapted for passage of hydraulic conduits which will be subsequently identified. The plate 101 is supported along its opposite longitudinal edges by a pair of opposite flanges 105 (FIGS. 3 and 5) inwardly turned from the opposite sides 107 of said boom housing.

The carrier proximate end of the hydraulic assembly 97 comprises a double valved structure 109 (FIG. 7 and FIG. 12) which has a body 361 enclosed in a generally rectangular casing 261. Said casing is proportioned for sliding fit longitudinally of the boom housing for assembly purposes. A pair of mounting blocks 111 (FIG. 12), which are vertically spaced apart when boom 26 is in horizontal position, may be fashioned integrally with the valve housing or casing 261. Each of said blocks has a transverse bore 113. The transition piece 99 is also provided with a plurality of apertures 115, said apertures being disposed for registration with the bores 113.

The inertia shaker housing 31 is fashioned at one end with a rectangular adapter collar 117. Said adapter collar is proportioned to receive transition piece 99 in a snug through sliding fit. The opposite sides of said adapter collar have two pairs of what may be considered vertically aligned holes 119, only one of each pair of holes being seen in FIG. 12. Holes 119 are adapted for registration with apertures 115 and bores 113. When thusly arranged, the tree shaker assembly may be releaseably connected together by a pair of bolts 121. Suitable nuts 123 threadingly engaged on the threaded ends of said bolts complete the securance.

The inertia shaker 17 comprises a drive proximal sheave 127, a drive distal sheave 128 (FIGS. 8 and 9), and a fixed displacement hydraulic motor 129. Said motor, in the instant embodiment, is adapted for rotation in the direction of the arrow 132 to motivate said sheaves. The casing of said hydraulic motor has a mounting flange 131 which is rigidly secured to a hanger plate 133 by means of a pair of conventional lock nut assemblies 135. Said hanger plate is rigidly secured within the housing 31 and suspended from one of the side plates 33 by a suitable fastener assembly 136 (FIG. 8).

A double grooved pulley 137 (FIG. 9) is corotationally mounted with the output shaft of said motor 129. A pair of parallel pulley belts 139 drivingly engage in the grooves, respectively, of the pulley 137 to drive the sheaves 127 and 128.

For operation of the motor 129 there are provided a pair of hydraulic fluid circulating conduits 141 through which flow may be controlled in a usual manner by a suitable valve in a valve cluster generally designated 143 (FIGS. 1 and 2). To facilitate manual control of the valve cluster 143, it is supported on an extension 147 of the arm 41 adjacent the operator's station 29. A plurality of valve control handles 145 (FIGS. 1 and 2) project for easy manipulation from the cluster 143. Not only is control of fluid pressure to the motor 129 managed from said operator's station, but also control of fluid pressure for clamping and unclamping of yoke 15 and extension and contraction of the boom 26 is managed through said cluster. The details of construction for such control means may be conventional and therefore are omitted.

Sheave 128 has a pair of adjoining grooves 149 (FIG. 9) and pulley 127 has a flat periphery. Grooves 149 of sheave 128 are disposed in alignment with the grooves in the pulley 137, said sheave and said pulley being disposed in alignment longitudinally of tree shaker assembly 25. Each of said pulley belts has an outgoing course 151 and a return course 153 which merge into a loop, the inner surface of which drivingly engages the grooves of the sheave 128. The drive proximate sheave 127 is also belt driven, but only with the outer surface of the return course 153 of said pulley belts. By reason of the foregoing arrangement, each of the sheaves is adapted rotationally to be driven in a direction opposite the direction of drive for the other, in the directions of arrows 185 and 187, as the motor 129 rotates.

For timing the inertia shaker 17, each of said sheaves carrier an external gear flange 155. Said gear flanges are disposed in meshing association for synchronous corotation of the sheaves.

A weight assembly 157, which has a general arcuate profile and herein comprising a plurality of like plates of arcuate section, is secured to an eccentric portion 159 of each of said sheaves. Each weight assembly 157 is arranged to extend beyond the periphery of its sheave to produce a maximum centrifugal force effect. Moreover, the arrangement of weight assemblies is shown adjusted so that each thereof, during rotation, will occupy the same angular phase as the other thereof at 180° intervals to effect maximum throw or shaking force longitudinally of the tree shaker assembly 25.

Each of said sheaves 127 and 128 is fashioned with a hub 165 (FIG. 9). Moreover, each of said sheaves has an annular drive flange 167 which defines the grooves 149 and from the periphery of which its gear flange 155 is fashioned as a ring. Each drive flange 167 is offset toward one end portion of its hub 165 to define about the other end portion thereof a pocket 169. Each weight assembly 157 is anchored against a face of its corresponding drive flange. A plurality of tie rods 161 connect the plates of each weight assembly to its corresponding sheave, a pair of opposed lock nuts 163 threadingly mounted on opposite ends of each tie rod releaseably securing each sheave and its weight assembly together. The arrangement of the parts is such that each weight assembly is adapted to rotate into and out of overlapping association with an opposite sheave because the rotation is accommodated by pockets 169. Furthermore, the number of plates of each weight assembly can be selectively varied to adjust the magnitude of the reciprocative centrifugal force imparted to the tree shaker assembly 25.

Preferably, the inertia shaker housing side plates 33 are disposed in planes parallel to the side walls 107 of the rectangular boom housing 89. A shaft 171 (FIG. 9) defines an axis of rotation transversely of side plates 33 for each of said sheaves 127 and 128. A pair of transversely aligned apertured bearing blocks 175 are suitably secured against each side plate 33 for support of opposite end portions of each shaft 171. Adjacent the apertures in said blocks 175, the side plates 33 have registering apertures 177. The opposite end portions of each shaft 171 project through opposite of said blocks and a pair of corresponding apertures 177. Each block 175 partially overhangs an adjacent aperture 177 and provides an abutment for a washer 179. Each of the latter is retained against an adjacent block by a lock nut 173 which is threadingly engaged on the outer end portion of each shaft 171.

The hub 165 of each sheave is mounted concentrically with a corresponding shaft 171 between the side plates 33. A pair of opposed anti-friction ball bearings 181, which are spaced axially of each shaft in opposite ends of each hub, provide a journal for each of said sheaves 127 and 128. An annular spacer 183, which is disposed about each shaft 171 within its hub 165, holds the inner races of each pair of ball bearings 181 against their opposite bearing block 175 and retains an associated hub in proper alignment transversely of the said inertia shaker housing 31.

An alternative inertia shaker 670 (FIG. 10) can be employed in the tree shaker assembly 25 to selectively vary shaker speed. It comprises a pair of sheaves 627 and 628 which correspond to sheaves 127 and 128. A pair of fixed displacement oppositely rotatable hydraulic motors 629 and 630 are adapted to provide the motive force for said last mentioned inertia shaker.

Figures 10, 11:
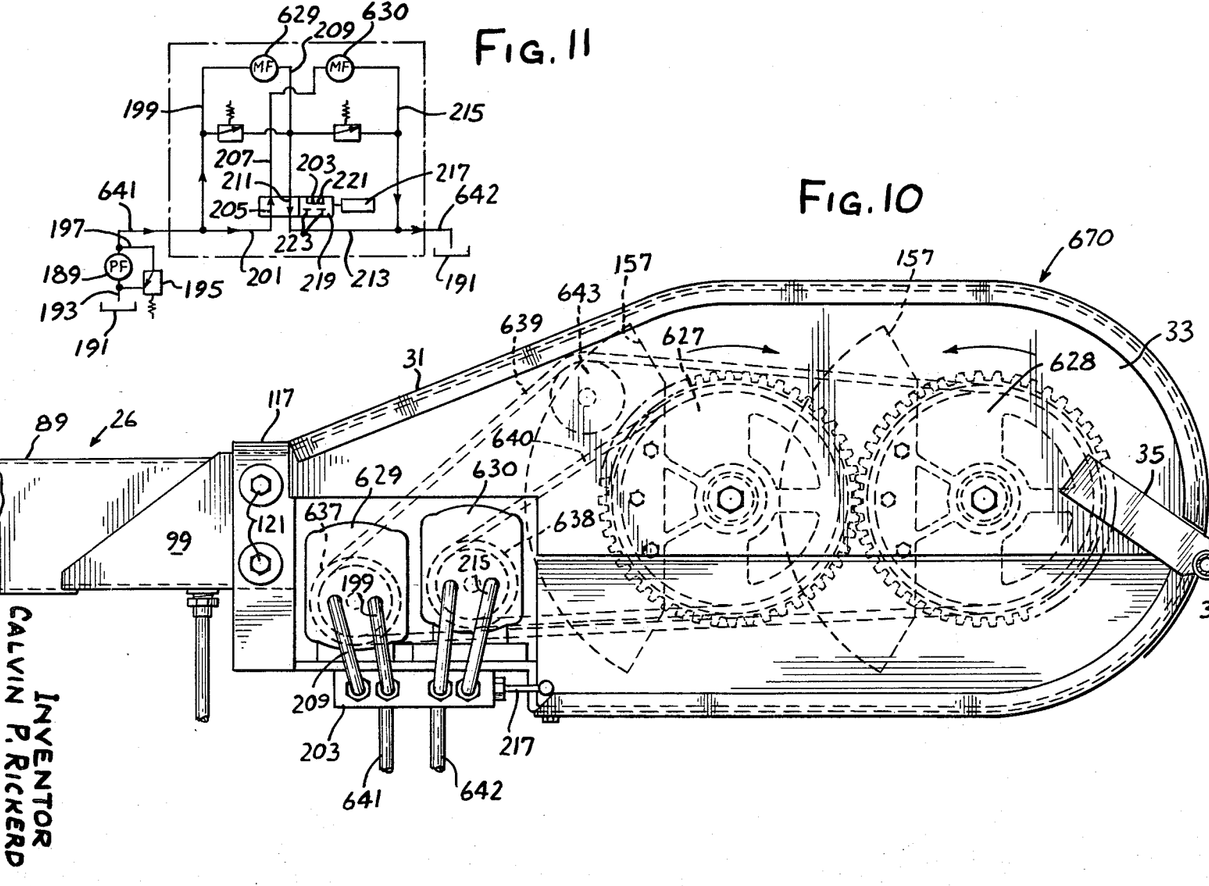
FIG. 10 is a side elevational view similar to FIG. 8, however showing a modified form of the inertia shaker.
FIG. 11 is a schematic representation of an hydraulic system for control of the inertia shaker shown in FIG. 10.

The motor 629 is disposed distal to the assembly of the sheaves 627 and 628, the latter sheave being distal to the assembly of said motors 629 and 630. An output pulley 637 is arranged for corotation with the motor 629. Pulley belt means 639 frictionally couple output pulley 637 and sheave 628 in driving association for rotation in the same angular direction. An idler pulley 643 mounted within the inertia shaker housing 31 is arranged to hold said pulley belt means from engagement with the sheave 627. An output pulley 638 is arranged for corotation with the motor 630. Pulley belt means 640 frictionally couples the output pulley 638 and the sheave 627 in driving association for rotation in the same angular direction. The pulley wheels 627 and 628 are rotated in opposite angular directions.

Motors 629 and 630 have a common fluid input conduit 641 (FIGS. 10 and 11) and a common fluid return conduit 642. A fixed displacement hydraulic pump 189 is connected in fluid continuity with said input conduit for operation of said motors to produce output torques of opposite angular directions. A reservoir 191 (FIG. 11) which is arranged in receiving association with said output conduit provides a fluid source for said pump, the latter being supplied through a tube section 193. A relief valve 195 is communicatively connected to said tube section and said input conduit on opposite sides of said pump through conventional tubular means 197.

Input conduit 641 is communicatively connected to the input side of motor 629 through a tubular member 199. A second tubular member 201 connects said input conduit to the input side of a slidably mounted spool valve 203. A duct section 205 within the spool valve connects the output end of tubular member 201 to the input end of a tubular member 207. The latter member serves as an hydraulic fluid supply for motor 630. A fluid return tube 209 carries fluid from the return side of the motor 629 to said spool valve 203. A duct section 211 within the spool valve connects the return end of the tube 209 with the input end of a fluid return section 213. Return section 213 is communicatively connected to fluid return conduit 642. Also in fluid communication with said fluid return conduit is the return end of a fluid return tube 215. The input end of the latter is communicatively connected to the return side of motor 630.

A handle 217 is employed to control sliding of said spool valve to the left and return from the position of FIG. 11 in a conventional manner. When the spool valve 203 is conditioned as illustrated in FIG. 11, fluid will be pumped simultaneously from the supply conduit 641 into the motor 629 through tubular member 199 and from said supply conduit to the motor 630 through the tubular member 207. The latter phenomenon results from communicative connection established by the duct section 205 and the tubular member 201 with said supply conduit. Thereby, the motors 629 and 630 will be driven simultaneously or in parallel. Fluid return from the motor 630 to the conduit 642 will be via the tube 215. Fluid return from the motor 629 to the conduit 642 will be via the tube 209 and return section 213 through the duct section 211 in the spool valve 203.

The spool valve has a spool or U-shaped canal 221 and a pair of tube caps 223 which are conditioned inactive in FIG. 11. Said caps are arranged so that upon shifting of valve 203 to the left with respect to FIG. 11, they will block flow through said last valve from tubular member 201 and to return section 213. However, canal 221 is arranged so that upon shifting said spool valve to the left, fluid communication will be established between the output end of return 209 and the input end of tubular member 207 through said canal. With valve 203 thusly shifted to the left of the condition of FIG. 11, motors 629 and 630 will be connected for successive or series torque output, rather than simultaneously torque output. Accordingly, fluid from the supply conduit 641 will flow first to motor 629. Then it will flow from motor 629 through the tube 209, then through canal 221 into tubular member 207. From the latter, fluid will then flow through motor 630, and out therefrom through tube 215 into the outflow conduit 642. When in series, because flow rate on each motor is doubled, the speed of each motor will be doubled and accordingly the shaker speed will be doubled.

The hydraulic assembly 97 comprises a boom extension control section 225 (FIGS. 5 and 13) which includes the double valved structure 109 and a clamp control section 227 which includes another double valved structure 229. The double valved structure 109 is mounted on the inner end of the boom extension section 225, and the double valved structure 229 comprises the inner end of the clamp control section 227. The latter double valved structure is disposed at the outer end of the boom extension control section 225 and comprises a body 361 disposed with a rectangular casing 259 (FIG. 6) whereby said last structure is adapted for a snug but sliding fit in boom housing 89.

A pair of hydraulic fluid tubes 228 and 230, which serve reversibly as fluid supply and return members, are secured by conventional fittings 231 and 233 to the double valved structure 109 so that said last tubes respectively communicate with a pair of fluid conducting bores 235 and 237 (FIG. 7) in body 361 of said double valved structure. The parts are proportioned so that double valved structure 109 is disposed adjacent opening 103, heretofore described, so that the tubes 228 and 230 enter the rectangular boom housing 89 through said opening. Fluid control in said tubes is managed by appropriate manipulation of valve cluster 143.

Double valved structure 229, however, is spaced from said opening 103 longitudinally of said boom housing. A pair of pipes 239 and 241 (FIGS. 5 and 14) are communicatively connected with said last double valved structure. The latter pipes extend longitudinally of said boom housing therewithin and are connected, respectively, by fittings 247 in fluid communication with a pair of flexible tubes 249 and 251 which enter said boom housing through opening 103.

A pair of hangers 243 and 263 are spaced longitudinally of said boom housing and support pipes 239 and 241. A reversibly extendable cylinder 245 (FIGS 5, 12 and 13) arranged within the boom housing 89 comprises the boom extension control section 225. Said hangers are rigidly suspended from said cylinder 245 and have depending portions in which the pipes 239 and 241 are secured. Said hangers may be secured on said cylinder by any suitable means, such as weldin, as shown at 248 and 250. Tubes 249 and 251 function reversibly as fluid supply and return conduits, the flow through which is controlled through appropriate management at the valve cluster 143.

Figure 6:
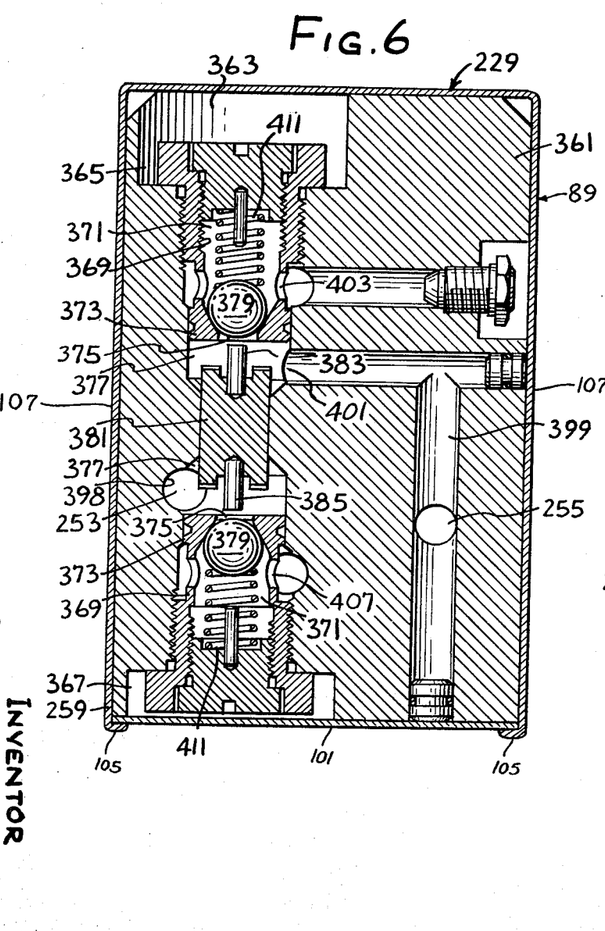
FIG. 6 is an enlarged cross-sectional view of the boom taken substantially on the line 6—6 of FIG. 5 and looking in the direction of the arrows.

At their carrier distal or outer ends, pipes 239 and 241 communicatively connect with a pair of bores 253 and 255, respectively, in the body 361 of the double valved structure 229 (FIG. 6). The latter structure is rigidly arranged at the outer end of the reversibly extendable cylinder 245. Securance may be by means of welding or the like, as at 257 (FIG. 5), whereby said last double valved structure is adapted to move longitudinally of said boom housing with said cylinder.

A passaged piston rod generally designated 264 comprises an inner tube 265 and an outer sleeve 271. Tube 265 has an axial passage which defines an open-ended chamber 267. Said last tube projects outwardly from the double valved structure 109. It terminates short of the double valved structure 229 to develop a gap 269. The inner end of tube 265 is secured in the body 361 of the double valved structure 109. Sleeve 271 is concentrically disposed about said last tube, the inner end of said sleeve being rigidly secured to body 361 of the double valved structure 109 by suitable means such as lines of welding or the like 273. Sleeve 271 terminates also short of the double valved structure 229, whereby the gap 269 has a portion which extends between said sleeve 271 and the last mentioned double valved structure. A spacer ring 275 arranged between sleeve 271 and tube 265 serves to seal the outer end of said piston rod 264 and to hold the outer end portion of said sleeve in concentric relationship with said last tube. By reason of the foregoing arrangement, an annular fluid chamber 277 is generated between said sleeve and said tube.

Cylinder 245 is arranged substantially concentrically about sleeve 271. While its outer end is rigidly secured to the casing 259 of the double valved structure 229, its inner or carrier proximate end is spaced from double valved structure 109. The relationship in the proportioning of said cylinder and sleeve is such that therebetween an annular fluid chamber 279 is generated. At its outer or carrier distal end, said chamber 279 is occluded by a nut 281 which threadingly engages on an end portion 283 of said sleeve in a manner so that said nut is in slidable engagement with the inner surface of said cylinder. Moreover, the shape of said nut is such that an enlarged fluid pocket 285, which is communicatively connected with gap 269, develops between the outer end portion 283 of said sleeve and the double valved structure 229. The foregoing arrangement provides fluid continuity between open-ended chamber 267, gap 269, and the pocket 285, in a fluid space which is limited by double valved structure 229, nut 281, spacer 275, the outer end 283 of sleeve 271, and tube 265.

An annular anti-friction bearing 287 is urged by nut 281 against a shoulder 289 generated in the outer surface of said sleeve. Said bearing a proportioned for snug fit about said sleeve in sliding engagement with cylinder 245. The nut 281, together with said bearing, serves as a barrier to the flow of hydraulic fluid between the well or pocket 285 and fluid chamber 279. A pair of annular sealing members 291 and 293, which may be of conventional construction, are adapted actually to block fluid flow. They are mounted in recesses in said anti-friction bearing for sealing engagement respectively with the inner surface of said cylinder and the outer surface of said sleeve.

An axially elongated slide 295 which is circular in cross-section is arranged by a snap ring 294 against the inner surface of said cylinder 245 for co-extension therewith in sliding engagement with the external surface of the sleeve 271. Said slide serves as a sliding plug effectively to seal the carrier proximate or inner end of fluid chamber 279. To that end, there are provided a pair of annular sealing members 297 and 299. They may be of conventional construction and may be disposed respectively in a pair of recesses formed in said slide for engagement against the inner and outer surfaces of said cylinder and said sleeve, respectively. Sleeve 271 is ported as at 301 to provide communicative connection between fluid chamber 277 and fluid chamber 279.

An inner or carrier proximate end portion 303 (FIG. 13) of slide 295 is reduced and externally threaded. A take-up nut 305 engages on the threaded end portion. Said nut is adapted to draw said slide inwardly during assembly operation into retained association with the snap ring 294 and an end portion 307 of said cylinder. A conventional wiper member 309 may be secured within a countersink in said nut, in fluid cleaning relationship with the outer surface of said sleeve.

Figure 13:
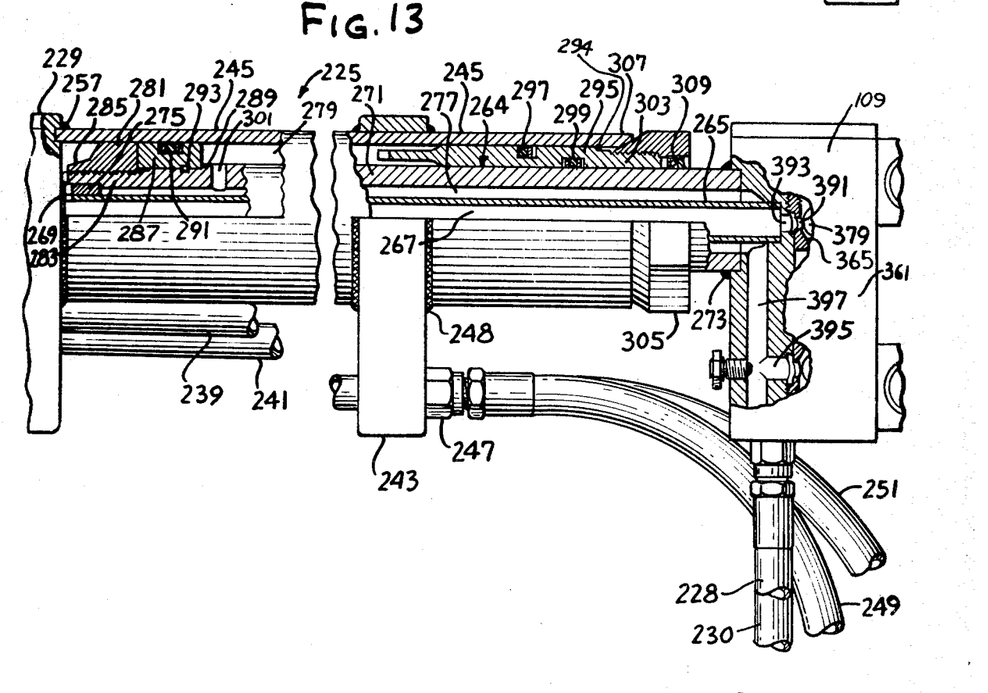
FIG. 13 is an enlargement of the right side of FIG. 5.

The aforedescribed hydraulic mechanism for management of boom section 225 is double-acting and, assuming an initial position as shown in FIGS. 5 and 13, functions as follows: As fluid pressure in the open-ended chamber 267 increases, it causes a corresponding increase in pressure in gap 269 and pocket 285. This increase in pressure causes cylinder 245, together with the slide 295 and the nut 305, to shift or slide to an extended position to the left from the position of FIG. 13 in proportion to the increase in pressure. Double valved structure 229, together with clamp section 227, which are rigidly carried from said cylinder, accordingly will be shifted in their entirety to the left with respect to FIGS. 5 and 14, while simultaneously fluid chamber 279 will become smaller causing a return flow of hydraulic fluid from said last chamber through ports 301 and out of the system through chamber 277. Application of reverse fluid pressure in chamber 277 causes reverse phenomena with contraction of the boom assembly by reason of withdrawal toward the carrier of cylinder 245 as such reverse pressure causes enlargement of fluid chamber 279. Accordingly, under such reverse pressure conditions, double valved structure 229 will move inwardly causing return flow from pocket 285 and tube 265. Forward and reverse flow for extension and contraction of the boom section 225, as well as locking of its parts, are managed through the double valved structure 109 by means and in a manner to be defined in ensuing description.

The yoke 15 comprises a relatively fixed jaw 311 (FIG. 2) spaced outwardly from the outer end of the boom 26. A relatively movable or opposable jaw 313 is arranged between the fixed jaw and the boom for extension toward and away from said last mentioned jaw to grippingly engage a tree limb or the like.

Double valved structure 229 controls reversible extension of opposable jaw 313. To that end, clamp section 227 comprises a cylinder 315 (FIG. 14) which is arranged concentrically with the longitudinal axis of said boom. Said last cylinder 315 projects outwardly from double valved structure 229 to which the inner end of said cylinder is rigidly secured by any suitable means such as lines of welding 317.

Figure 14:
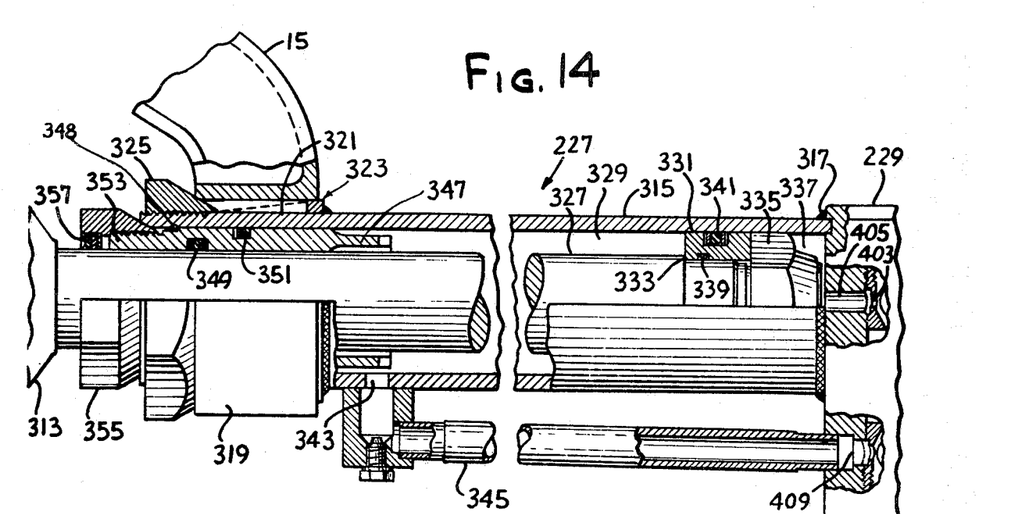
FIG. 14 is an enlargement of the left side of FIG. 5.

Fixed jaw 311 comprises a C-shaped member whose inner end portion comprises a collar 319 (FIG. 14). Collar 319 is rigidly concentrically secured about the outer end portion 321 of cylinder 315. For that purpose, an annular boss or wedge 323 is rigidly secured to the outer surface of said cylinder. A nut 325 which threadingly engages on the outer end of said last cylinder is adapted to urge said collar into frictional retention on said wedge.

A piston rod 327, which is arranged for extension from said last cylinder, is concentrically disposed therewithin. When said piston rod is in contracted condition (FIG. 14), its inner end is spaced slightly from double valved structure 229 to provide a gap which defines a fluid chamber 337. The arrangement of said last cylinder and piston rod generates therebetween an annular chamber 329. An anti-friction bearing 331, which is disposed about an inner end portion of said piston rod, isolates chamber 329 from the fluid chamber 337. A nut 335 mounted on the threaded inner end of said piston rod urges bearing 331 against a shoulder 333 externally generated on said piston rod. Bearing 331 is proportioned for sliding engagement with the inner surface of cylinder 315. To preclude passage of fluid between chambers 329 and 337, a pair of fluid sealing rings 339 and 341 are disposed in recesses in the bearings 331 in sealing engagement with the outer and inner surfaces of said piston rod and said cylinder, respectively.

Jaw 313 is rigidly secured on the outer end of said last piston rod for co-extension therewith and is thereby adapted to move toward and away from jaw 311. Extension of said piston rod is by means of increase of the fluid pressure in chamber 337. Fluid flow into chamber 337 is from double valved structure 229 in a manner which hereinafter will be more fully set forth. As said piston rod is urged from a retracted condition (as in FIG. 14) to extended or clamping condition, the volume of chamber 337 will enlarge. Simultaneously, the volume of chamber 329 will be reduced as hydraulic fluid returns to the double valved structure 229. To effectuate such fluid return, cylinder 315 has a port 343. Fluid conduit means 345 which are disposed partially within housing 89 and outside said cylinder communicatively connect fluid chamber 329 with double valved structure 229 through said port.

To return jaw 313 from extended aspect for limb release, pressure is applied in reverse by causing fluid flow into chamber 329 through the conduit 345. Consequently, said piston rod moves inwardly toward double valved structure 229. Accordingly, fluid in chamber 337 will be returned to said last valved structure as the size of said last chamber shrinks.

The outer limit of fluid chamber 329 is defined by means of an elongated slide 347 which is secured to the outer end portion of said cylinder by a snap ring 348. Said slide is circular in cross-section and disposed in fixed spaced relationship with the double valved structure 229 axially of said boom. Said slide serves to plug the outer end of fluid chamber 329 and is arranged in sealed sliding association with said piston rod and in sealed relationship with cylinder 315. To preclude passage of fluid from chamber 329 past slide 347, a pair of sealing rings 349 and 351 are provided. The latter rings may be of conventional construction and are disposed in a pair of grooves fashioned in said slide in sealing relationship with the outer surface of said piston rod and the inner surface of said last cylinder, respectively. The outer end portion 353 of said last slide is reduced and threaded. A nut 355 is threadingly engaged on said outer end portion in abutment with the outer end of said cylinder 315. During assembly operations, said nut is employed to draw said slide into locked relationship with snap ring 348 for securance to said last cylinder. A wiper member 357 is mounted in a countersink in nut 355 in cleaning association with the outer of said last piston rod.

Figure 7:
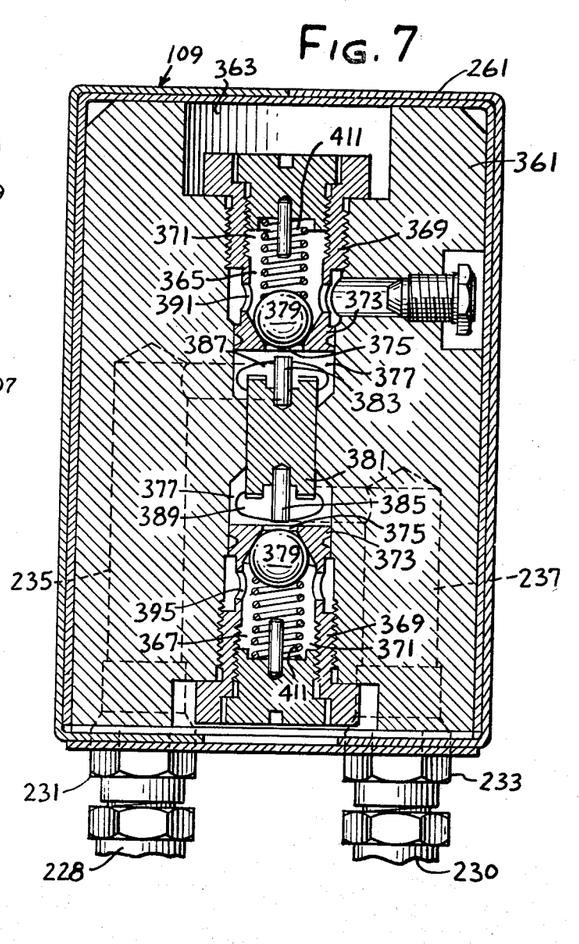
FIG. 7 is an enlarged cross-sectional view of the boom taken substantially on the line 7—7 of FIG. 5 and looking in the direction of the arrows.

Each of the bodies 361 of the double valved structures 109 and 229 has a bore 363 which may be considered vertically disposed in terms of orientation with respect to FIGS. 6 and 7. The ensuing description is in terms of such reference.

A valve trip 381 is arranged for sliding vertical movement in a medial part of each bore 363 to provide an upper quarter 365 and a lower quarter 367. A ball check assembly 369 is sealed in each of said quarters with its apertured seat 373 adjoining an associated valve trip. The arrangement is such that each ball check assembly divides its respective of quarters 365 and 367 into an inner valve chamber 371 and an outer chamber 377. The chambers 377 of each of the double valved structures 109 and 229 adjoin each other on opposite sides of their valve trip and provide a medial compartment in which their associated valve trip 381 is slidable upwardly and downwardly to expand one chamber 377 while contracting an adjacent thereof.

Each chamber 377 is adapted for fluid communication with its associated inner valve chamber 371 through an aperture 375 in a corresponding ball seat. However, such communication is normally blocked by the medium of a ball 379 associated with each check valve assembly 369 and biased into its seat 373 by a compression spring 411.

Each of the valve trips has a pair of upwardly and downwardly extending ball unseating fingers 383 and 385 which are aligned for entry into adjoining apertures 375 for ball upset as the valve trip is shifted. Each valve trip is proportioned for disposition in a central part of its bore 363 with its fingers disengaged from apertures 375 when fluid pressure on its opposite sides is equal. Under such neutral conditions, no ball 379 is unseated. In such neutral position, all boom parts conditioned by hydraulic fluid flow will be rigidly locked together.

The wall defining the upper of chambers 377 in double valved structure 109 has a port 387 (FIG. 7) which is in fluid communication with fluid tube 228 through the bore 235. The wall defining the lower of chambers 377 in double valved structure 109 has another port 389 which is in fluid communication with fluid tube 230 through bore 237. The port 387 is disposed adjacent the upper ball seat of its double valved structure, whereas the port 389 is disposed adjacent the lower ball seat of said last double valved structure. A valve trip 381 is arranged so that upon application of fluid pressure through the port 387, said last valve trip will be displaced downwardly to unseat the lower ball 379 in double valved structure 109. Simultaneously, such pressure will unseat the associated upper ball. On the other hand, when fluid pressure is applied through the port 389, said valve trip will be shifted upwardly to unseat the upper of said balls 379. Simultaneously, such last pressure will unseat the associated lower ball.

The upper ball check valve assembly of the double valved structure 109 is ported as at 391 (FIGS. 7 and 13) for fluid communication of the upper inner valve chamber 371 with fluid chamber 267. The latter communication is through a short bore or passage 393 which is fashioned in the body 361 of said last double valved structure. Valve chamber 371 of the lower ball check valve assembly of said last double valved structure is ported as at 395 (FIGS. 7 and 13) for fluid association with fluid chamber 277. The latter association is through a bore or canal 397 fashioned in the body 361 of said last mentioned double valved structure.

By reason of the foregoing construction, when fluid pressure is applied to either of the tubes 228 or 230, the other thereof becomes a return conduit. Pressure in either of said conduits will unseat both ball checks 379 of the double valved structure 109. When the valve assemblies 369 are thusly conditioned, through the apertures 375 port 387 will be in fluid communication with port 391 while fluid continuity will be established between the port 389 and the port 395.

Bore 253 opens into the lower chamber 377 in the double valved structure 229 through a port 398 (FIG. 6). Conduit or canal means 399 formed in the body 361 of said last double valved structure defines a port 401 through which fluid communication is achieved between the upper of the chambers 377 and the pipe 241 through bore 255. Ports 398 and 401, in their double valved structure 229, are the equivalents, respectively, of ports 389 and 387 in the other double valved structure 109. Upper valve chamber 371 of the double valved structure 229 is ported as at 403 (FIGS. 6 and 14) for fluid association with the chamber 337 through a short bore 405 fashioned in the body 361 of said last double valved structure. Lower chamber 371 of said double valved structure 229 is ported as at 407 for fluid communication with chamber 329 through a bore 409 fashioned in body 361 of said double valved structure 229. The carrier or inner end of tube 345 is rigidly secured in bore 409.

By reason of the foregoing structure, fluid pressure in either of the tubes 249 or 251 will cause the other thereof to become a return conduit. Such pressure also will cause responsive shifting of the valve trip 381 of double valved structure 229 upwardly or downwardly and, accordingly, unseat responsive balls 379 in the same manner as described for operation of the double valved structure 109.

As many changes or substitutions could be made in the above described construction and as many apparently widely different embodiments of the invention within the scope of the claims could be constructed without departing from the scope and spirit thereof, it is intended that all matter contained in the accompanying specification shall be interpreted as being illustrative and not in a limiting sense.

The embodiments of the invention in which an exclusive property or privilege is claimed are defined as follows:

1. In a boom assembly adapted for fruit harvesting and having an elongated boom, limb-engaging means mounted at one end of said boom, shaker means arranged at the other end of said boom to generate a reciprocative force for impression on said limb-engaging means, and carrier means to support said boom assembly, a boom-mounting assembly mounted on said carrier means and arranged about said boom for adjustable support thereof in partial shaker torque isolating association with said carrier means, said boom-mounting assembly including a cable having opposite end portions swingably held in said boom-mounting assembly and including a medial depending portion between said end portions, a wheel secured to a medial portion of said boom and received in said medial depending portion.

2. A boom assembly as defined in claim 1 wherein said boom-mounting assembly further includes a frame having a pair of spaced apart arms and mounted for rotation on said carrier means, the opposite end portions of said cable being connected to said arms respectively whereby said wheel is swingably supported between said arms.

3. In a boom assembly adapted for fruit harvesting and having a boom and limb-engaging means mounted at one end of said boom, shaker means arranged at the other end of said boom to impress a limb-shaking reciprocative force on said limb-engaging means longitudinally of said boom, said shaker means including a pair of driven eccentric assemblies mounted for rotation in opposite directions about parallel axes and arranged for disposition in like phases at 180° intervals of rotation, said shaker means further including power means having an output member arranged for rotation about an axis parallel to the axes of said driven eccentric assemblies, and endless means arranged on said output member for transmission of output torque to said eccentric assemblies, each of said eccentric assemblies including a hub, a flange having a pulley section arranged from one portion of each of said hubs and adapted for driving engagement with said endless means, and a gear ring having external teeth extending concentrically beyond each pulley portion, the teeth of said gear rings being operatively associated for synchronized rotation of said eccentric assemblies.

4. In a boom assembly adapted for fruit harvesting and having a boom and limb-engaging means mounted at one end of said boom, shaker means arranged at the other end of said boom to impart a limb-shaking reciprocative force on said limb-shaking means longitudinally of said boom, said shaker means including a pair of driven eccentric assemblies mounted for rotation in opposite directions about parallel axes and arranged for disposition in like phases at 180° intervals of rotation, said shaker means further including power means having an output member arranged for rotation about an axis parallel to the axes of said driven eccentric assemblies, and endless means arranged on said output member for transmission of output torque to said eccentric assemblies, each of said eccentric assemblies including a hub and an integral radial flange arranged about one portion of said hub, each of said flanges being disposed in coplanar relation to define coplanar annular pockets about the respective hubs, an eccentric weight secured to each of said flanges and extending radially therebeyond, said eccentric weights being disposed within the plane of said pockets whereby each pocket intermittently receives an eccentric weight as said eccentric assemblies are rotated by said power means.

5. In a boom assembly adapted for fruit harvesting and having an elongated member and limb-engaging means mounted from one end portion of said elongated member, speed adjustable shaker means arranged at the other end portion of said elongated member for reciprocation of said limb-engaging means longitudinally of said boom assembly at selected rates, said shaker means including a pair of rotatably power drivable eccentric assemblies phased for registration at 180° intervals to impart reciprocative shaker movement longitudinally of said elongated member, said eccentric assemblies arranged for selected reciprocative association in series and in parallel, said eccentric assemblies including a pair of eccentrically weighted rotatable members, and hydraulic means arranged for selectively driving said rotatable members in series and in parallel.

6. A boom assembly as defined in claim 5 in which said hydraulic means includes a hydraulic motor arranged to drive each of said rotatable members and hydraulic pump means arranged selectively to drive said motors in series and in parallel.

7. A boom assembly as defined in claim 6 in which said hydraulic pump means includes a pump, conduit means arranged in fluid communication with said pump for fluid pressure operation of said motors and shiftable valve means disposed in said conduit means to selectively provide a course of fluid flow from said pump to said motors simultaneously and in sequence for operation thereof in parallel and series.

8. In a boom assembly adapted for fruit harvesting and having an elongated member and limb-engaging means mounted from one end portion of said elongated member, speed adjustable shaker means arranged at the other end portion of said elongated member for reciprocation of said limb-engaging means longitudinally of said boom assembly at selected rates, said shaker means including a pair of eccentric assemblies rotatable about parallel axes, a pair of motors having output members rotatable about parallel axes, endless drive members arranged one within the other for torque transfer from said output members respectively to said eccentric assemblies, and means for driving said motors in sequence and together.

9. A boom assembly adapted for fruit harvesting and comprising an elongated boom housing having inner and outer end sections; an hydraulically operable mechanism disposed within said housing and having an inner end part and an outer end part arranged for extension from said outer end section longitudinally of said boom housing; limb engaging means mounted from said outer part for extension toward a limb bearing plant; shaker means arranged at said inner end section for reciprocating said limb engaging means and having an end portion adapted for reception in releasable association of said inner end section, and tie means rigidly releasably securing said inner end section, said inner part and said end portion in adjoining disposition.

10. A boom assembly as defined in claim 9 in which the inner end part of said hydraulically operable mechanism comprises a valve housing proportioned for snug releasable disposition with said boom housing, said inner end section proportioned for snug releasable disposition within said end portion, said valve housing, said inner end section and said end portion having means defining apertures registered each with the others for reception of said tie means.

11. In a boom assembly adapted for fruit harvesting and having an elongated extensible hydraulic mechanism, a limb-engaging clamp arranged from one end of said mechanism, said clamp including relatively movable jaw members for gripping said limb therebetween, shaker means arranged at the other end of said mechanism for generating an alternating force for conjoint reciprocation of said mechanism and said clamp, valved means arranged for retractible extension of said hydraulic mechanism to selectively position said clamp relative to said shaker means, and means for moving said jaws to releasably grip said limb.

12. A boom assembly as defined in claim 11 in which said valved means comprises an inner valved structure disposed in fixed relationship with said shaker means and an outer valved structure spaced longitudinally from said inner valve structure, first hydraulic extension means arranged for operation from said inner valved structure to extend said outer valved structure, and rigid connecting means arranged from said second valved structure for supporting said clamp for movement with said extension means.

13. A boom assembly as defined in claim 12 and further characterized by second hydraulic extension means arranged for operation from said outer valve structure to releasably grippingly position said clamp.

14. A boom assembly as defined in claim 13 in which said first hydraulic extension means comprises a first cylinder having an outer end rigidly connected to said outer valved structure and arranged for extension by said inner valved structure to extend said outer valved structure and said clamp.

15. A boom assembly as defined in claim 13 in which said clamp comprises a fixed jaw and a thereto opposable jaw, said second hydraulic extension means comprising a cylinder fixed to said outer valved structure and arranged to provide a support for said fixed jaw, and a piston mounted for extension from said second valved structure and arranged for co-extension with said opposable jaw.

16. In a boom assembly adapted for fruit harvesting and having an elongated extensible hydraulic mechanism, a limb-engaging clamp arranged from one end of said mechanism, said clamp including relatively movable members for gripping said limb therebetween, shaker means arranged at the other end of said mechanism for generating an alternating force for conjoint reciprocation of said mechanism and said clamp, valved means arranged for retractible extension of said hydraulic mechanism to selectively position said clamp relative to said shaker means, and means for moving said jaws to releasably grip said limb, said hydraulic mechanism further including a piston and cylinder combination arranged in telescopic association for extension and retraction upon application of fluid pressure, said valved means comprising a pair of valves arranged to control fluid pressure to extend and contract said combination, each valve selectively adapted to control fluid supply to and return from said combination while the other controls fluid return from and supply to said combination.

17. A tree shaker apparatus adapted to shake fruit from a tree, comprising:
- a mobile carrier;
- an elongated extensible boom on said carrier;
- a clamp on one end of said boom, said clamp including a pair of relatively movable jaws for gripping a tree to be shaken;
- a shaker mechanism mounted on an end of said boom opposite said one end for rapidly reciprocating said boom along its longitudinal axis;
- boom-mounting means for suspending said boom from said mobile carrier between said clamp and said shaker mechanism;
- first hydraulic means for extending and retracting said boom so as to move said clamp as a unit relative to said shaker mechanism whereby said clamp may be selectively positioned proximate to a tree to be gripped thereby; and
- second hydraulic means for moving said jaws toward and away from each other to releasably grip a tree therebetween.

18. The subject matter of claim 17, wherein said shaker mechanism includes a pair of eccentric assemblies mounted for rotation of respective shafts spaced from each other in the direction of longitudinal extent of said boom, said eccentric assemblies including coplanar weights disposed eccentrically about the respective shafts, whereby rotation of said eccentric assemblies imparts reciprocating movement to said boom for shaking fruit from a tree gripped by said clamp.

19. The subject matter of claim 17, wherein said boom-mounting means includes a U-shaped yoke mounted on said mobile carrier, a flexible member having opposite end portions secured to said yoke and having a depending media portion disposed within said yoke, and means secured on said boom defining an arcuate peripheral rim mounted on the medial portion of said flexible member, whereby said boom is swingably supported within said yoke.

References Cited
UNITED STATES PATENTS

| | | | |
|---|---|---|---|
| 2,690,639 | 10/1954 | Goodwin | 56—328 |
| 2,804,743 | 9/1957 | Gould et al. | 56—328 |
| 3,041,811 | 7/1962 | Sides | 56—328 |
| 3,120,091 | 2/1964 | Gould et al. | 56—328 |
| 3,121,304 | 2/1964 | Herbst | 56—328 |
| 3,225,520 | 12/1965 | King | 56—328 |
| 3,392,517 | 7/1968 | Nye | 56—328 |

RUSSELL R. KINSEY, Primary Examiner